United States Patent
Kim

(10) Patent No.: US 10,272,908 B2
(45) Date of Patent: Apr. 30, 2019

(54) METHOD AND DEVICE FOR CONTROLLING ENGINE CLUTCH OF HYBRID VEHICLE

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 15/603,578

(22) Filed: May 24, 2017

(65) Prior Publication Data

US 2018/0162378 A1 Jun. 14, 2018

(30) Foreign Application Priority Data

Dec. 13, 2016 (KR) .................... 10-2016-0169973

(51) Int. Cl.
*B60W 10/02* (2006.01)
*B60W 10/06* (2006.01)
(Continued)

(52) U.S. Cl.
CPC ............ *B60W 20/40* (2013.01); *B60W 10/02* (2013.01); *B60W 10/06* (2013.01); *B60W 10/30* (2013.01);
(Continued)

(58) Field of Classification Search
CPC ...... B60W 20/20; B60W 20/40; B60W 10/02; B60W 10/06; B60W 10/30; B60W 2510/0208; B60W 2510/0241; B60W 2510/0638; B60W 2510/0657; B60W 2510/081; B60W 2710/021; B60W 2710/0644; B60W 2710/0666;
(Continued)

(56) References Cited

U.S. PATENT DOCUMENTS 9,592,824 B1 * 3/2017 Kim ................. B60K 6/387
2005/0211479 A1 * 9/2005 Tamor .............. B60K 6/48
180/65.25

(Continued)

FOREIGN PATENT DOCUMENTS

KR 10-1684525 B1 12/2016
KR 10-1724472 B1 4/2017

*Primary Examiner* — Atul Trivedi
(74) *Attorney, Agent, or Firm* — Mintz Levin Cohn Ferris Glovsky and Popeo, P.C.; Peter F. Corless

(57) ABSTRACT

A method and device for controlling an engine clutch of a hybrid vehicle are provided. The method includes setting a target speed of an engine to change a driving mode of the hybrid vehicle from an EV mode to an HEV mode and operating a HSG to adjust an engine speed to reach the target speed. An engine clutch that connects the engine with a driving motor or disconnects the engine from the driving motor is engaged to start when the speed of the engine is maintained at the target speed. A kiss point generated when the engine clutch is in a slip state is detected to learn the kiss point of the engine clutch and an output of the engine is increased based on a driver required torque when the speed of the engine and a speed of the driving motor are synchronized after the kiss point is learned.

9 Claims, 4 Drawing Sheets

(51) Int. Cl.
*B60W 10/30* (2006.01)
*B60W 20/20* (2016.01)
*B60W 20/40* (2016.01)
*F16D 48/06* (2006.01)

(52) U.S. Cl.
CPC ............ *B60W 20/20* (2013.01); *F16D 48/06* (2013.01); *B60W 2510/0208* (2013.01); *B60W 2510/0241* (2013.01); *B60W 2510/0638* (2013.01); *B60W 2510/0657* (2013.01); *B60W 2510/081* (2013.01); *B60W 2710/021* (2013.01); *B60W 2710/0644* (2013.01); *B60W 2710/0666* (2013.01); *B60W 2710/081* (2013.01); *B60Y 2200/92* (2013.01); *B60Y 2300/182* (2013.01); *B60Y 2300/42* (2013.01); *B60Y 2300/43* (2013.01); *B60Y 2300/60* (2013.01); *F16D 2500/106* (2013.01); *F16D 2500/1064* (2013.01); *F16D 2500/10412* (2013.01); *F16D 2500/3065* (2013.01); *F16D 2500/3067* (2013.01); *F16D 2500/30401* (2013.01); *F16D 2500/30406* (2013.01); *F16D 2500/50245* (2013.01); *Y02T 10/6286* (2013.01); *Y10S 903/93* (2013.01)

(58) Field of Classification Search
CPC .... B60W 2710/081; F16D 2500/10412; F16D 2500/106; F16D 2500/1064; F16D 2500/30401; F16D 2500/30406; F16D 2500/3065; F16D 2500/3067; F16D 2500/50245; B60Y 2200/92; B60Y 2300/182; B60Y 2300/42; B60Y 2300/43; B60Y 2300/60; Y10S 903/93
USPC .......................................................... 701/22
See application file for complete search history.

(56) References Cited

U.S. PATENT DOCUMENTS

| | | | |
|---|---|---|---|
| 2008/0220937 A1* | 9/2008 | Nozaki | B60K 6/365 477/86 |
| 2010/0114442 A1* | 5/2010 | Kadota | B60W 50/0098 701/68 |
| 2011/0125378 A1* | 5/2011 | Blessing | F16D 48/06 701/68 |
| 2014/0129104 A1* | 5/2014 | Park | F16D 48/06 701/68 |
| 2014/0163827 A1* | 6/2014 | Kim | B60W 10/11 701/54 |
| 2014/0180521 A1* | 6/2014 | Tsuchikawa | B60K 6/48 701/22 |
| 2015/0019073 A1* | 1/2015 | Lee | B60W 10/06 701/36 |
| 2016/0025160 A1* | 1/2016 | Kim | F16D 48/066 701/67 |
| 2016/0207523 A1* | 7/2016 | Kotsuji | B60K 6/48 |
| 2017/0166196 A1* | 6/2017 | Park | B60W 10/02 |
| 2018/0170359 A1* | 6/2018 | Kim | B60W 20/40 |

* cited by examiner

METHOD AND DEVICE FOR CONTROLLING ENGINE CLUTCH OF HYBRID VEHICLE

CROSS-REFERENCE TO RELATED APPLICATION

This application claims priority to and the benefit of Korean Patent Application No. 10-2016-0169973 filed in the Korean Intellectual Property Office on Dec. 13, 2016, the entire contents of which are incorporated herein by reference.

BACKGROUND

(a) Field of the Invention

The present invention relates to a hybrid vehicle, and more particularly, to a method and a device for controlling an engine clutch of a hybrid vehicle.

(b) Description of the Related Art

An environmentally-friendly vehicle includes a fuel cell vehicle, an electric vehicle, a plug-in electric vehicle, and a hybrid vehicle, and typically includes a motor configured to generate driving force. A hybrid vehicle uses an internal combustion engine and power of a battery together. In other words, the hybrid vehicle efficiently combines and uses power of the internal combustion engine and power of a motor. The hybrid vehicle includes an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle includes a hybrid control unit (HCU) configured to operate the hybrid vehicle, an engine control unit (ECU) configured to operate the engine, a motor control unit (MCU) configured to operate the motor, a transmission control unit (TCU) configured to operate the transmission, and a battery control unit (BCU) configured to operate and manage the battery. The battery control unit may be referred to as a battery management system (BMS). The starter-generator may be referred to as an integrated starter and generator (ISG) or a hybrid starter and generator (HSG).

The hybrid vehicle may be driven in a driving mode, such as an electric vehicle (EV) mode, which is an electric vehicle mode using power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery. The hybrid vehicle operates the engine clutch to transmit power or separate power between the motor and the engine for switching the mode. Operation hydraulic pressure of the engine clutch determining an operation of the engine clutch considerably influences drivability, power performance, and fuel efficiency of the hybrid vehicle, so that the operation hydraulic pressure of the engine clutch needs to be accurately controlled.

The operation hydraulic pressure of the engine clutch may be determined by initial hydraulic pressure by which torque is started to be transmitted as both ends of the friction material of the engine clutch are in contact with each other, and feedback hydraulic pressure for adjusting the hydraulic pressure of the engine clutch by receiving feedback of speeds of the engine and the motor. The initial hydraulic pressure point may be referred to as a kiss point. The kiss point may be changed during the use of the engine clutch. Accordingly, it is necessary to control hydraulic pressure of the engine clutch to allow the engine clutch to transmit the torque at an appropriate point by learning the kiss point.

The above information disclosed in this section is merely for enhancement of understanding of the background of the invention and therefore it may contain information that does not form the prior art that is already known in this country to a person of ordinary skill in the art.

SUMMARY

The present invention provides a method and a device for controlling an engine clutch of a hybrid vehicle to improve driving responsiveness of the vehicle by learning a kiss point of the engine clutch in a cranking state of an engine that switches a driving mode from an electric vehicle (EV) mode to an hybrid electric vehicle (HEV) mode and by advancing a time of power transmission of the engine.

An exemplary embodiment of the present invention provides the method for controlling the engine clutch of the hybrid vehicle that may include: setting, by a controller, a target speed of an engine to change a driving mode of the hybrid vehicle from an electric vehicle (EV) mode to an hybrid electric vehicle (HEV) mode; operating, by the controller, a hybrid starter-generator (HSG) to adjust a speed of the engine to maintain the target speed; engaging, by the controller, an engine clutch that connects the engine with a driving motor or disconnects the engine from the driving motor to start when the speed of the engine is maintained at the target speed; detecting, by the controller, a kiss point generated when the engine clutch is in a slip state to learn the kiss point of the engine clutch; and increasing, by the controller, an output of the engine based on a torque required by a driver of the hybrid vehicle when the speed of the engine and a speed of the driving motor are synchronized after the kiss point is learned.

The method for controlling the engine clutch of the hybrid vehicle may further include: learning, by the controller, a delivery torque of the engine clutch when the kiss point is detected. The controller may be configured to determine a time of synchronization of the engine speed and the motor speed as a time when a delivery torque of the engine clutch occurs. The target speed of the engine may be greater than the speed of the driving motor. A speed control for the hybrid starter-generator performed by the controller may be stopped after the kiss point of the engine clutch is detected.

An exemplary embodiment of the present invention provides the device for controlling the engine clutch of the hybrid vehicle that may include: an engine clutch configured to connect an engine with a driving motor or disconnect the engine from the driving motor; and a controller configured to set a target speed of the engine to change a driving mode of the hybrid vehicle from an electric vehicle (EV) mode to an hybrid electric vehicle (HEV) mode and to operate a hybrid starter-generator (HSG) to adjust a speed of the engine to maintain the target speed. The controller may be configured to engage the engine clutch to start when the speed of the engine is maintained at the target speed, detect a kiss point generated when the engine clutch is in a slip state to learn the kiss point of the engine clutch, and increase an output of the engine based on a torque required by a driver of the hybrid vehicle when the speed of the engine and a speed of the driving motor are synchronized after the kiss point is learned.

The method and the device for controlling the engine clutch of the hybrid vehicle according to the exemplary embodiment of the present invention may simultaneously perform a synchronization of the engine speed and the motor speed and the kiss point learning of the engine clutch by improving a speed control method performed after a cranking of the engine. The exemplary embodiment of the present invention may improve learning frequency and may increase robustness of the engine clutch control by learning the kiss point and the delivery torque of the engine clutch when the driving mode is switched from the EV mode to the HEV mode (or when the engine is cranked).

The exemplary embodiment of the present invention may reduce a fuel or an electric energy used in the kiss point learning of the engine clutch by including the kiss point learning process of the engine clutch in the synchronization control of the engine speed and the motor speed. Further, the exemplary embodiment of the present invention may advance a time at which a power of the engine is transmitted to a driving wheel of the vehicle to decrease a time for transition between the EV mode and the HEV mode since the exemplary embodiment does not separately determine synchronization of the engine speed and the motor speed so that physical synchronization of the engine speed and the motor speed is performed by a slip friction generated in the learning process.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
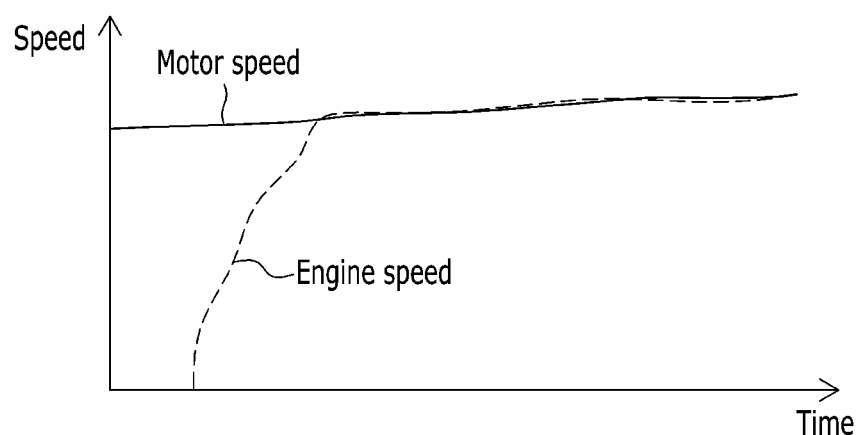
FIG. 1 is a view illustrating engine speed control of a hybrid vehicle according to a related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced. Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

An engine clutch, which is a power transmission device of a hybrid vehicle, has nonlinear characteristics according to temperature of the engine clutch, a difference between speeds of an engine and a drive motor, or a state change of an engine clutch actuator such as a hydrostatic clutch actuator (HCA), and thus it is necessary to continuously learn a kiss point of the engine clutch. A related art learns the kiss point by driving a power source when a transmission of a vehicle is in a parking (P) stage or a neural (N) stage and the vehicle stops or the related art learns the kiss point by adjusting a speed of an engine (or a drive motor) during driving of a vehicle. In particular, the related art performs the kiss point learning by adjusting a speed of an engine or a motor which is the power source disposed at both ends of the engine clutch when the transmission is in the parking (P) stage or the neural (N) stage and the vehicle stops. Another related art performs the kiss point learning during a shifting time or a coasting drive when a transmission of the vehicle is in a drive (D) stage and the vehicle is being driven. The shifting time appears when a driving mode of the vehicle is switched from a hybrid electric vehicle (HEV) mode to an electric vehicle (EV) mode.

Furthermore, the engine clutch connects the cranked engine to the drive motor to transmit a power of the engine to a driving wheel of a hybrid vehicle when a driving mode of the vehicle is switched from an electric vehicle (EV) mode to a hybrid electric vehicle (HEV) mode. Speeds of power sources at both ends of the engine clutch are synchronized for engagement of the engine clutch to prevent unnecessary impact to thus engage the engine clutch. The engine may be operated to maintain the speed of the motor during the synchronization of the speeds to thus engage the engine clutch after a difference between speeds of the engine and the motor is eliminated.

The kiss point learning and a delivery torque learning of the engine clutch may be performed by separately adjusting a speed of the power source when the transmission is in the parking (P) stage or the neural (N) stage and the vehicle stops or when the transmission is in the drive (D) stage and the vehicle is being driven to engage the engine clutch. However, the related art has a separate learning process (e.g., a process in which a gear shift stage is changed to the parking (P) stage or the neural (N) stage for the kiss point learning of the engine clutch) that is not related to driving of the vehicle, and thus, the related arts uses a more complex driving method. A frequent operation of the power source for the learning process may cause additional energy consumption.

FIG. 1 is a view illustrating engine speed control of a hybrid vehicle according to a related art. Referring to FIG. 1, the related art may increase an engagement force of an engine clutch to increase an output of an engine transmitted to the clutch after the related art synchronizes the engine speed with a speed of a motor by reducing an overshoot to decrease a time for synchronization of the engine speed and the motor speed.

Figure 2:
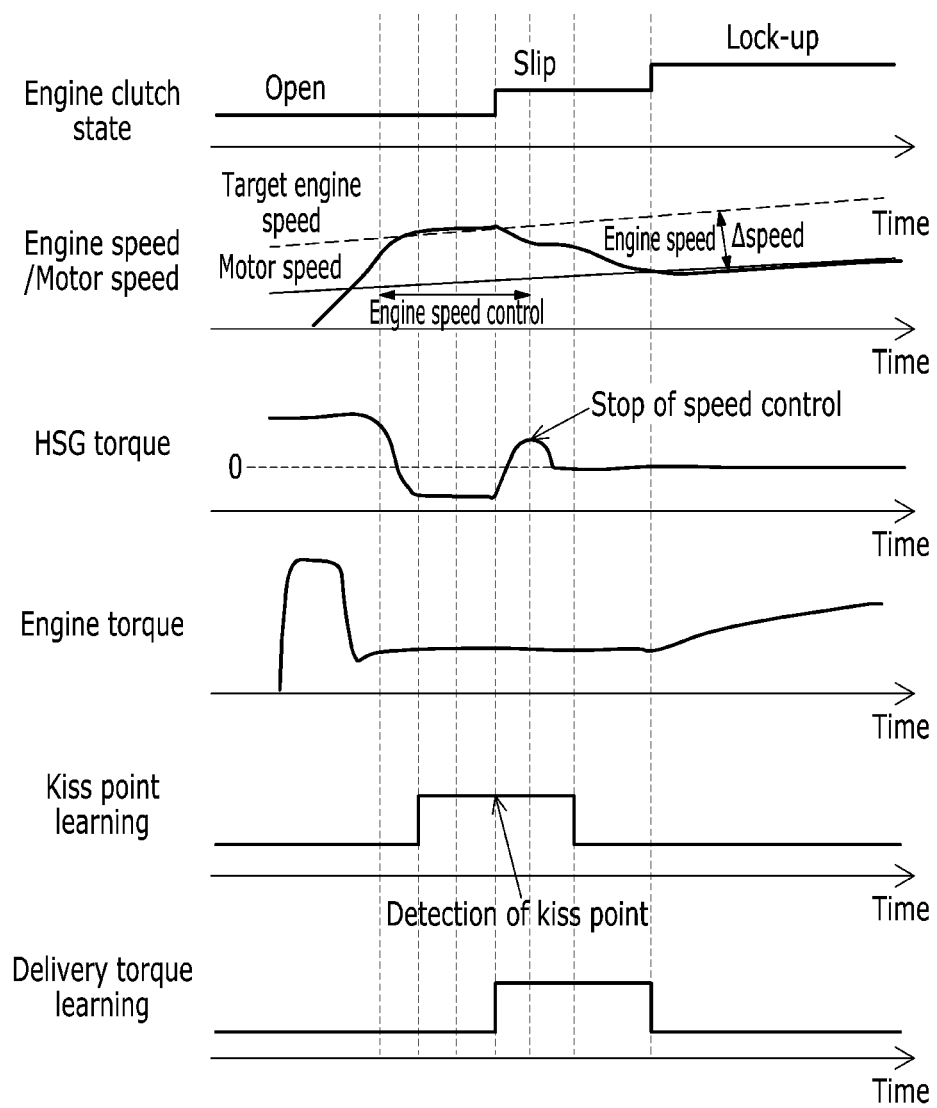
FIG. 2 is a view illustrating a method for controlling an engine clutch of a hybrid vehicle according to an exemplary embodiment of the present invention
Figure 3:
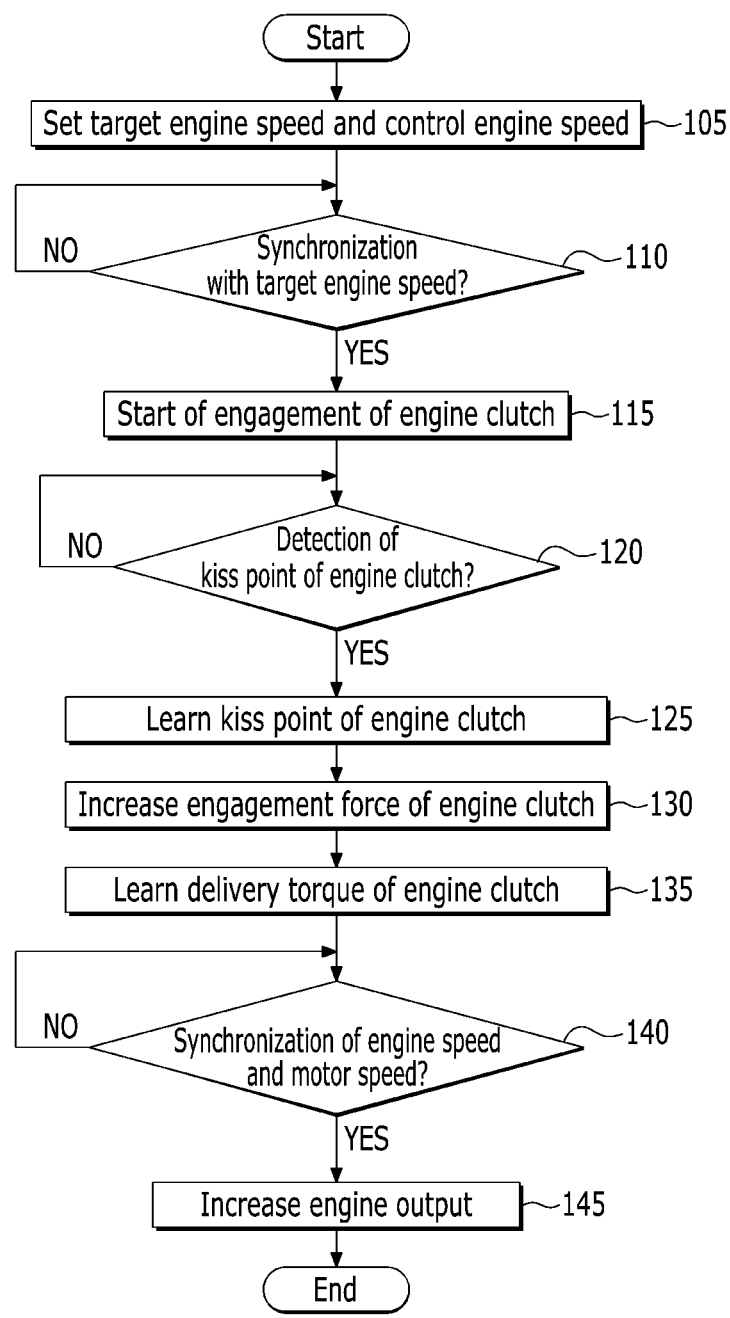
FIG. 3 is a flowchart illustrating the method for controlling the engine clutch of the hybrid vehicle according to an exemplary embodiment of the present invention.
Figure 4:
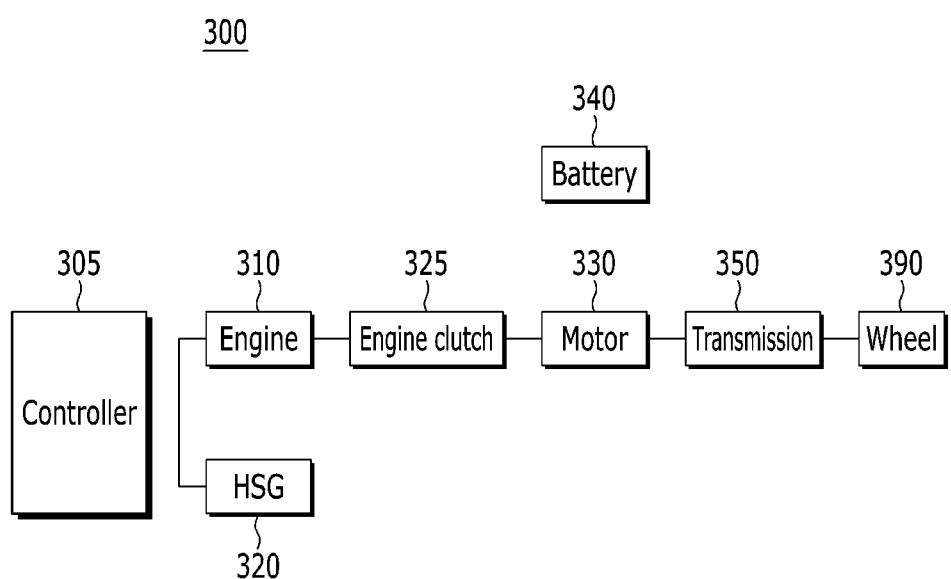
FIG. 4 is a block diagram illustrating the hybrid vehicle to which the method for controlling the engine clutch is applied according to an exemplary embodiment of the present invention.

FIG. 2 is a view illustrating a method for controlling an engine clutch of a hybrid vehicle according to an exemplary embodiment of the present invention. FIG. 3 is a flowchart illustrating the method for controlling the engine clutch of the hybrid vehicle according to an exemplary embodiment of the present invention. FIG. 4 is a block diagram illustrating the hybrid vehicle to which the method for controlling the engine clutch is applied according to an exemplary embodiment of the present invention.

Referring to FIGS. 2, 3, and 4, in a control step 105, a controller 305 may be configured to set a target speed of an engine 310 to change a driving mode of a hybrid vehicle 300 from an electric vehicle (EV) mode to an hybrid electric vehicle (HEV) mode and may be configured operate a hybrid starter-generator (HSG) 320 to adjust a speed of the engine to reach and maintain the target speed. The target speed of the engine 310 may be greater than a speed of the driving motor 330. The target speed of the engine 310 may be provided by the following equation.

The target engine speed=the motor speed+a speed difference(or Δspeed)

In the above equation, the speed difference may be predetermined as a speed difference between the speed of the engine 310 and the speed of the motor 330, and may be a function of temperature.

In particular, the controller 305 may be configured to set the target speed for an engine speed control. A target number of rotation (e.g., a target revolutions per minute (RPM)) of the engine, which is the target speed of the engine 310, may be determined by the following equation.

The target RPM=the motor RPM+a delta RPM

In the equation, the delta RPM is a difference between a number of rotation of the motor and the target number of rotation of the engine, which is the speed difference between the motor speed and the target engine speed, and may be a function of temperature.

Furthermore, the hybrid vehicle 300 may include the controller 305, the engine 310, the HSG 320, the engine clutch 325, the motor (or the driving motor) 330 which may be an electric motor, a battery 340, a transmission 350, and wheels (or driving wheels) 390. A device for controlling the engine clutch of the hybrid vehicle may include the controller 305 and the engine clutch 325. The hybrid vehicle 300, which is a hybrid electric vehicle, may use the engine 310 and the motor 330 as power sources, and includes the engine clutch 325 disposed between the engine 310 and the motor 330 to operate the hybrid vehicle 300 in an electric vehicle (EV) mode in which the hybrid vehicle 300 travels by the motor 330 when the engine clutch 325 is opened, and in a hybrid electric vehicle (HEV) mode in which the hybrid vehicle 300 is capable of travelling by both the motor 330 and the engine 310 when the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using power of the motor, and the HEV mode, which uses rotational force of the engine as main power and uses rotational force of the motor as auxiliary power based on whether the engine clutch 325 disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU). The HCU may be configured to start the engine 310 by operating the HSG 320 when the engine stops. The HCU may be a highest or overall controller, and may be configured to synthetically operate controllers (e.g., the MCU) connected to a network such as a controller area network (CAN) which is a vehicle network, and may be configured to execute overall operation of the hybrid vehicle 300.

The MCU may be configured to operate the HSG 320 and the motor 330. In particular, the MCU may be configured to adjust an output torque of the driving motor 330 via the network based on the control signal output from the HCU, and thus may be configured to operate the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage supplied from the battery 340 into a three-phase alternating current (AC) voltage to drive the driving motor 330. The MCU may be disposed between the battery 340 and the motor 330.

The ECU may be configured to adjust a torque of the engine 310. The ECU may be configured to adjust an operating point (or a driving point) of the engine 310 via the network based on a control signal output from the HCU, and may be configured to operate the engine to output an optimal torque. The TCU may be configured to operate the transmission 350. For example, the controller 305 may be one or more microprocessors operated by a program or hardware including the microprocessor. The program may include a series of commands for executing the method for controlling the engine clutch of the hybrid vehicle according to an exemplary embodiment of the present invention.

Furthermore, the engine 310 may include a diesel engine, a gasoline engine, a liquefied natural gas (LNG) engine, or a liquefied petroleum gas (LPG) engine, and may be configured to output a torque at the operating point based on a control signal output from the ECU. The torque may be combined with driving force of the driving motor 330 in the HEV mode. The engine 310 may be connected to the motor 330 via the engine clutch 325 to generate a power transmitted to the transmission 350.

The HSG 320 may be configured to operate as a motor based on a control signal output from the MCU to start the engine 310, and may be configured to operate as a generator when the start of the engine 310 is maintained to provide generated electric power to the battery 340 via the inverter. The HSG 320 may be connected to the engine 310 through a belt. Additionally, the HSG 320, which is a motor that cranks the engine, may be directly connected to the engine. The engine clutch 325 may be disposed (or mounted) between the engine 310 and the driving motor 330, and may be operated to switch power delivery between the engine 310 and the motor 330. The engine clutch 325 may connect or intercept power between the engine and the motor depending on switching of the HEV mode and the EV mode. Operation of the engine clutch 325 may be executed by the controller 305. The engine clutch 325 may include a dry type engine clutch.

The motor 330 may be operated by a three-phase alternating current (AC) voltage output from the MCU to generate a torque. The motor 330 may be operated as a generator during coasting drive or regenerative braking to supply a voltage (or regenerative energy) to the battery 340. The battery 340 may include a plurality of unit cells. A high voltage for providing a driving voltage (e.g., about 350-450 V DC) to the motor 330 that provides driving power to the wheels 390 or the HSG 320 may be stored in the battery 340.

The transmission 350 may include a multiple speed transmission, such as an automatic transmission or a dual clutch transmission (DCT), or a continuously variable transmission (CVT), and may shift to a desired gear using hydraulic pressure based on control of the TCU to operate engagement elements and disengagement elements. The transmission 350 may be configured to transmit driving force of the engine 310 and/or the motor 330 to the wheels 390, and intercept power delivery between the motor 330 (or the engine 310) and the wheels 390.

According to a synchronization step 110, the controller 305 may be configured to determine whether the speed of the engine 310 is synchronized with or maintained at the target speed. According to a start step 115, after the speed of the engine 310 is maintained at the target speed, the controller 305 may be configured to engage the engine clutch 325 to start. According to a detection step 120, the controller 305 may use an output signal of a sensor mounted within the hybrid vehicle 300 to determine whether a kiss point of the engine clutch 325 is detected. The speed control or adjustment for the HSG 320 performed by the controller 305 may be stopped (terminated) after the kiss point of the engine clutch 320 is detected.

The kiss point may be a starting point of torque delivery, and may be pressure of a fluid (e.g., oil) that converts a state of the clutch into the slip state in which the clutch starts friction. The kiss point may indicate an initial hydraulic pressure by which torque is started to be transmitted as two friction members included in the clutch 325 are in contact with each other. The kiss point may be used for control to switch a driving mode of a hybrid vehicle from an electric vehicle (EV) mode to a hybrid electric vehicle (HEV) mode. The slip state of the clutch 325 may be started at the kiss point.

According to a learning step 125, the controller 305 may be configured to detect the kiss point of the engine clutch 325 to learn the kiss point of the engine clutch. The controller 305 may further be configured to perform a standby operation for learning the kiss point of the engine clutch when the speed of the engine 310 starts to be maintained at the target speed. According to an increase step 130, the controller 305 may be configured to increase an engagement force of the engine clutch 325 after the kiss point of the engine clutch 325 is detected.

According to a learning step 135, the controller 305 may be configured to start to learn (or detect) a delivery torque of the engine clutch 325 when the engagement force of the engine clutch 325 is increased (or when the kiss point is detected). The delivery torque of the engine clutch, which is torque transmitted by physical contact of two friction members included in the engine clutch, may be estimated from hydraulic pressure supplied to the engine clutch and the friction coefficient of the friction members. The delivery torque of the engine clutch 325 may be used as information (e.g., hydraulic pressure supplied to the engine clutch) for engagement of the engine clutch required when the hybrid vehicle 300 is being driven in the HEV mode. The hydraulic pressure may prevent clutch engagement shock of the engine clutch.

According to a check step 140, in the learning process of the delivery torque, the controller 305 may be configured to determine or check whether the speed of the engine 310 is synchronized with the speed of the motor 330 by reducing the speed of the engine 310 using the HSG 320. When the speed of the engine and the speed of the motor are synchronized, the controller 305 may be configured to determine a time of synchronization of the engine speed and the motor speed as a time when the delivery torque of the engine clutch occurs. When the speed of the engine 310 and the speed of the motor 330 are synchronized, the engine clutch 325 may be in a lock-up state.

When the engine clutch is in the lock-up state, the engine speed may correspond to the motor speed. In FIG. 2, the slip state of the clutch 325 may indicate a state in which the clutch starts friction and a speed difference between both ends of the engine clutch is greater than a predetermined value. The lock-up state of the clutch may indicate a state in which there is no speed difference between the both ends and 100% torque applied to the input of the clutch is transferred to output of the clutch. An open state of the clutch may indicate a state in which the both ends do not interfere with each other and the clutch is physically separated. According to an increase step 145, when the speed of the engine and the speed of the motor are synchronized, the controller 305 may be configured to increase an output (or a torque) of the engine 310 from the time when the delivery torque is generated to satisfy a torque required by a driver of the vehicle.

As described above, when the driving mode is switched from the EV mode to the HEV mode, the exemplary embodiment of the present invention may simultaneously perform engagement and learning of the engine clutch so that the exemplary embodiment advances a time at which a driving force of the engine is transmitted to the driving wheels. Thus, the exemplary embodiment may prevent unnecessary energy consumption due to a separate learning process.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

305: controller
310: engine
320: HSG
325: engine clutch
330: motor

What is claimed is:

1. A method for controlling an engine clutch of a hybrid vehicle, comprising:
   setting, by a controller, a target speed of an engine to change a driving mode of the hybrid vehicle from an electric vehicle (EV) mode to a hybrid electric vehicle (HEV) mode;
   operating, by the controller, a hybrid starter-generator (HSG) to adjust a speed of the engine to follow the target speed;
   engaging, by the controller, an engine clutch that connects the engine with a driving motor or disconnects the engine from the driving motor to start when the speed of the engine is maintained at the target speed;
   detecting, by the controller, a kiss point generated when the engine clutch is in a slip state to learn the kiss point of the engine clutch; and
   increasing, by the controller, an output of the engine based on a torque required by a driver of the hybrid vehicle when the speed of the engine and a speed of the driving motor are synchronized after the kiss point is learned,
   wherein when the driving mode is changed from the EV mode to the HEV mode, engagement and learning of the engine clutch are simultaneously performed.

2. The method of claim 1, further comprising:
   learning, by the controller, a delivery torque of the engine clutch when the kiss point is detected.

3. The method of claim 1, further comprising:
   determining, by the controller, a time of synchronization of the engine speed and the motor speed as a time when a delivery torque of the engine clutch occurs.

4. The method of claim 1, wherein the target speed of the engine is greater than the speed of the driving motor.

5. The method of claim 1, wherein a speed adjustment for the hybrid starter-generator performed by the controller is stopped after the kiss point of the engine clutch is detected.

6. A device for controlling an engine clutch of a hybrid vehicle, comprising:
   an engine clutch configured to connect an engine with a driving motor or disconnect the engine from the driving motor; and
   a controller configured to set a target speed of the engine to change a driving mode of the hybrid vehicle from an electric vehicle (EV) mode to a hybrid electric vehicle (HEV) mode and operate a hybrid starter-generator (HSG) to adjust a speed of the engine to follow the target speed,
   wherein the controller is configured to engage the engine clutch to start when the speed of the engine is maintained at the target speed, detect a kiss point generated when the engine clutch is in a slip state to learn the kiss point of the engine clutch, and increase an output of the engine based on a torque required by a driver of the hybrid vehicle when the speed of the engine and a speed of the driving motor are synchronized after the kiss point is learned, and
   wherein when the driving mode is changed from the EV mode to the HEV mode, engagement and learning of the engine clutch are simultaneously performed.

7. The device of claim 6, wherein the controller is configured to determine a time of synchronization of the engine speed and the motor speed as a time when a delivery torque of the engine clutch occurs.

8. The device of claim 6, wherein the target speed of the engine is greater than the speed of the driving motor.

9. The device of claim 6, wherein the adjustment of the speed is stopped after the kiss point of the engine clutch is detected.

* * * * *